Jan. 16, 1968  G. E. MAFFEY, JR  3,363,699
CANTILEVERED ROTOR MEANS FOR PNEUMATIC TOOL
Filed July 22, 1965  2 Sheets-Sheet 1
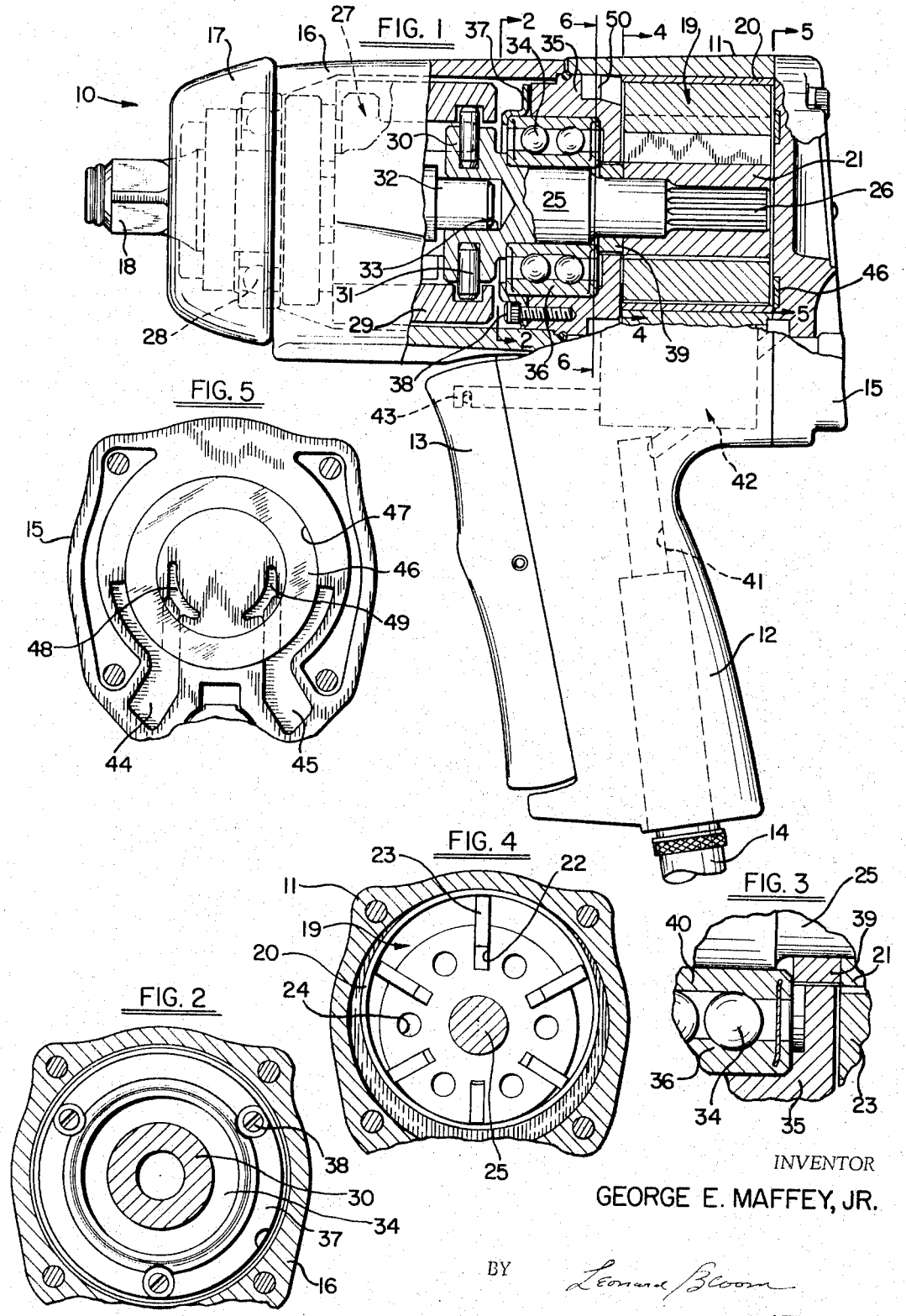
INVENTOR
GEORGE E. MAFFEY, JR.
BY  Leonard Bloom
ATTORNEY

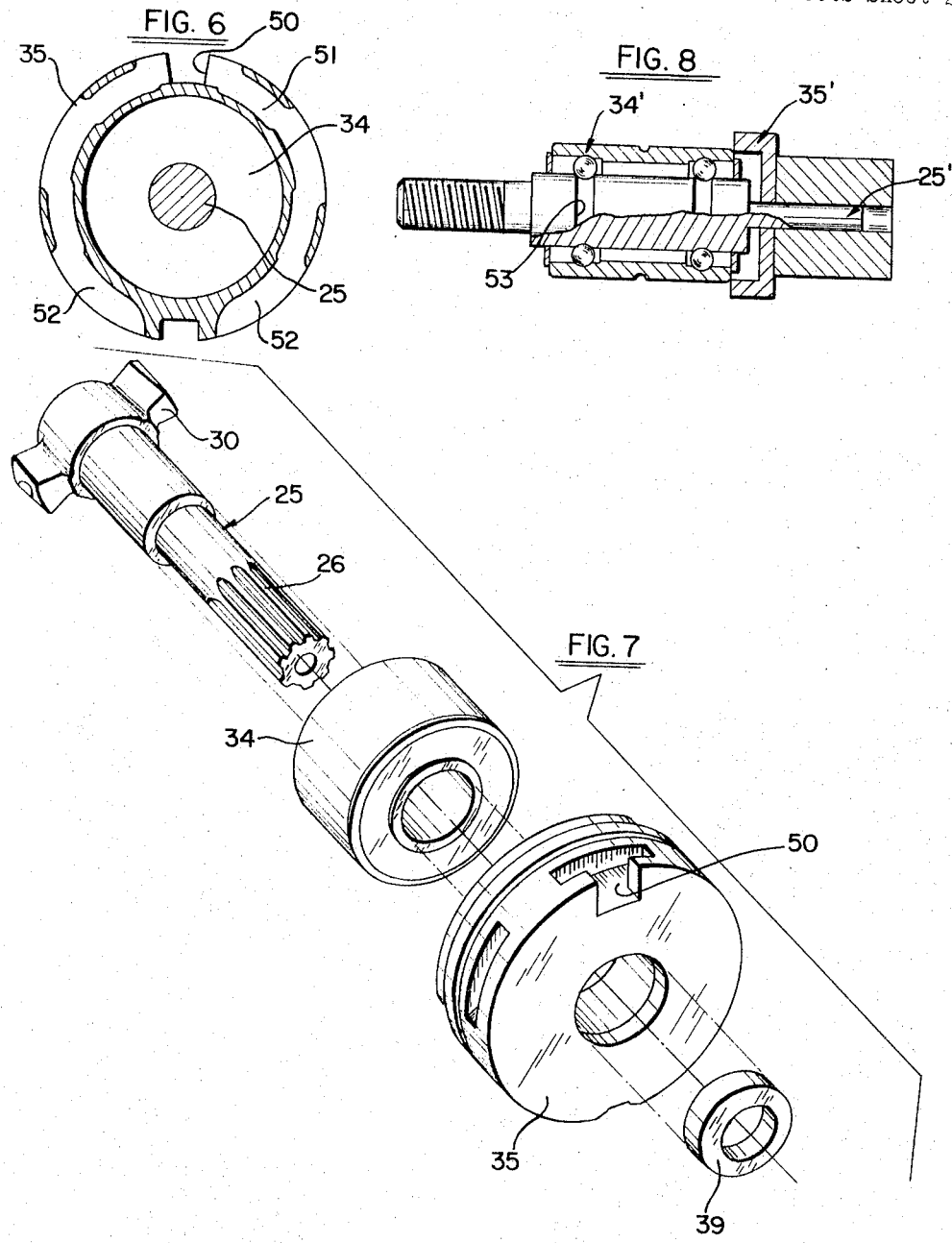

United States Patent Office 3,363,699
Patented Jan. 16, 1968

3,363,699
CANTILEVERED ROTOR MEANS FOR PNEUMATIC TOOL
George E. Maffey, Jr., Baltimore County, Md., assignor to The Black and Decker Manufacturing Company, Towson, Md., a corporation of Maryland
Filed July 22, 1965, Ser. No. 474,025
6 Claims. (Cl. 173—93.5)

ABSTRACT OF THE DISCLOSURE

A pneumatic tool is provided with an improved means for cantilever mounting its rotor shaft and for supporting one end of its transmission. In the disclosed embodiment, the tool comprises an impact wrench having a motor housing, an impact clutch housing, and a plate secured therebetween. The plate comprises a front end plate for the motor, and a double-row ball bearing is retained in the end plate. The rotor shaft is journaled in the bearing and has a portion extending rearwardly therefrom into the motor housing. This rearwardly-extending portion of the rotor shaft, which is totally unsupported at its end, carries a rotor within the motor housing. This rotor is spline-fitted on the rotor shaft and has a limited axial floating movement in the motor housing. The rotor shaft further has a portion extending forwardly of the bearing, and this forwardly-extending portion has a blind axial bore formed therein for rotatably supporting one end of a spindle of the impact clutch mechanism.

Brief summary of the invention

The invention finds utility in a pneumatic tool having a motor housing, a transmission housing extending forwardly therefrom, and a plate means separating the motor housing from the transmission housing; and the invention resides in the improvement which comprises a bearing means retained in said plate means, a rotor shaft journaled in said bearing means, said rotor shaft having a portion extending rearwardly of said bearing means into the motor housing, said rearwardly-extending portion being unsupported at its end, whereby said rotor shaft is cantilever mounted, a rotor means carried by said rearwardly-extending portion of said rotor shaft, said rotor shaft also having a portion extending forwardly of said bearing means, and a transmission within the transmission housing, said transmission having at least one element thereof supported by said forwardly-extending portion of said rotor shaft.

In accordance with the further teachings of the present invention, said bearing means comprises a double-row ball bearing, thus substituting for the three separate ball bearings heretofore required in the art. Additionally, said plate means comprises a front end plate for said rotor means, and said rotor means is spline-fitted on said rearwardly-extending portion of said rotor shaft. A spacer collar is piloted on said rotor shaft, radially between said rotor shaft and said front end plate, and axially between said bearing means and said rotor means; and an end cap is secured rearwardly of the motor housing, whereby said spline-fitted rotor means has a limited axial floating movement between said end cap and said spacer collar. Further, said forwardly-extending portion of said rotor shaft has a blind axial bore formed therein, and said element of said transmission comprises a spindle having an end portion rotatably fitted in said blind axial bore. Moreover, said forwardly-extending portion of said rotor shaft is enlarged, radially of said blind axial bore, and said transmission comprises an impact clutch mechanism having a hollow-cylindrical hammer mass rotatably supported upon said enlarged forwardly-extending portion of said rotor shaft.

As a result, the invention achieves its general object by facilitating the construction of an improved pneumatic tool, such as a portable pneumatic impact wrench, which is compact, lightweight, has fewer parts, and is more economical to manufacture.

These and other objects of the present invention will become apparent from a reading of the following specification taken in conjunction with the enclosed drawings, in which:

Description of the drawings

FIGURE 1 is a side elevation of a preferred pneumatic tool incorporating the teachings of the present invention, with parts being broken away and sectioned to illustrate the cantilevered rotor supporting means, and with certain other parts being illustrated in broken lines to indicate the valvular means and the impact clutch mechanism;

FIGURE 2 is a transverse section, taken along the lines 2—2 of FIGURE 1, and showing the preferred means for retaining the outer race of the double-row ball bearing within the forward end plate;

FIGURE 3 is an enlarged fragmentary portion of FIGURE 1, showing an optional spacer collar between the rotor and the inner race of the double-row ball bearing;

FIGURE 4 is a transverse section, taken along the lines 4—4 of FIGURE 1, and showing the conventional rotor eccentrically mounted within the stator of the pneumatic motor;

FIGURE 5 is a transverse section, taken along the lines 5—5 of FIGURE 1, and showing the passages in the combination end cap and rearward end plate for ducting "live" air into the rotor;

FIGURE 6 is a section view, taken along the lines 6—6 of FIGURE 1, showing the air passages formed within the forward end plate to facilitate the discharge of air out of the tool;

FIGURE 7 is an exploded perspective of the cantilevered rotor shaft, the bearing for supporting the same, the forward end plate within which the bearing is retained, and the optional spacer collar; and FIGURE 8 is substantially identical to a portion of FIGURE 1, but illustrates a modification in which the double-row ball bearing, instead of being retained within the forward end plate, is disposed forwardly of the end plate and axially adjacent thereto.

With reference to FIGURE 1, there is illustrated a pneumatic impact wrench 10 with which the teachings of the present invention may find particular utility. It will be appreciated by those skilled in the art, however, that the essence of the invention is equally applicable to other types of pneumatic tools and devices, and that the specific showing of the impact wrench 10 is not intended to confine the scope of the present invention.

With this in mind, the wrench 10 generally comprises a motor housing 11 having a pendant handle portion 12, a pivoted trigger 13 on the handle, an air inlet 14 at the bottom of the handle, a rear end cap 15 rearwardly of the motor housing, an impact clutch housing 16 forwardly of the motor housing, a conventional rubber bumper 17 on the impact clutch housing, and an output spindle 18 journaled in the impact clutch housing and formed to receive a suitable socket or the like.

The motor housing 11 has a pneumatic motor 19 which comprises a stator 20 and a rotor 21. The stator 20 is formed as a cylindrical sleeve and then is integrally cast with the casting of the motor housing 11. The rotor 21, see FIGURE 4, comprises a generally cylindrical member, preferably sintered, which is eccentrically positioned with respect to the stator sleeve 20 by an eccentric machining of the motor housing. A plurality of circumferentially-arranged radial slots 22 are formed in the rotor 21, and respective vanes 23 are slidably mounted within these radial slots. Also, the rotor 21 is provided with a plurality of longitudinal through bores 24 to decrease its overall weight.

The rotor 21 is provided with a rotor shaft 25; and preferably, the rotor has a splined or equivalent keyed connection 26 with its rotor shaft. The rotor shaft 25 extends forwardly of the motor and drives an impact clutch mechanism (or other transmission) disposed within the impact clutch housing 16. This impact clutch mechanism, denoted generally as at 27, forms no part of the present invention, but is described more particularly in the Sindelar Patents 3,001,428 and 3,001,429. This impact clutch mechanism 27 has a forward portion supported in a suitable bearing 28 which is retained within the forward portion of the impact clutch housing 16; and the impact clutch mechanism 27 further has a generally-cylindrical hammer mass 29 which has its rearward portion supported upon a radially-enlarged forward portion 30 of the rotor shaft 25 by means of pins 31. In addition, the impact clutch mechanism preferably has an element 32 piloted concentrically within a blind axial bore 33 formed in the forward portion of the rotor shaft 25.

The advantages of compactness, lightweight, ruggedness, and overall economy of parts and their assembly, are obtained by means of an improved cantilever mounting of the rotor shaft 25 within the tool housing. To this end, the rotor shaft 25 is journaled within a suitable bearing means, which preferably comprises a double-row ball bearing 34. As shown in FIGURE 1, this double-row ball bearing 34 is preferably disposed within a forward end plate 35, and the bearing 34 has an outer race 36 which is retained in the forward end plate 35 by means of a washer 37 and screws 38.

In such a manner, the rotor shaft 25 and the rotor 21 are cantilever mounted within the tool, with the double-row ball bearing 34 thus providing the sole supporting means for the rotor shaft within the tool. In addition, and as previously noted, the rearward portion of the impact clutch mechanism 27 is supported upon the radially-enlarged portion 30 of the rotor shaft 25; and since the shaft is supported in the bearing 34, the rearward portion of the impact clutch mechanism 27 is thus supported by the bearing 34. Consequently, the bearing 34 not only provides the sole supporting means for the rotor 21, but also provides the rear supporting means for the impact clutch mechanism 27. In this regard, the single bearing 34, which is a readily-available commercial component, takes the place of three bearings—two for the motor and one (of the two bearings) for the clutch mechanism—which have been habitually resorted to in the prior art. Moreover, the use of the single bearing 34, in conjunction with the other structural features of the invention, facilitates the design and manufacture of a pneumatic tool which is compact and lightweight, has fewer number of parts, is more economical, and yet is rugged, reliable, and has a performance which is comparable, if not superior, to competitive commercial units of a bulkier more-expensive design.

With reference again to FIGURE 1, and with further reference to FIGURES 3 and 7, the rotor shaft 25 extends rearwardly of the bearing 34 and in a direction towards the end cap 15 of the tool. Preferably, but not necessarily, a spacer collar 39 is disposed between the inner race 40 of the bearing 34 and the rotor 21, as shown more clearly in FIGURE 3. Since the rotor 21 has a splined connection 26 with the rotor shaft 25, the rotor 21 preferably has a limited axial floating movement with respect to the end cap 15.

With further reference to FIGURES 5 and 6, the air ducting arrangement is as follows: the "live" air is received through the air inlet 14 at the bottom of the handle 12 and enters a suitable conduit 41. A valvular means, denoted generally as at 42, is disposed between the conduit 41 and the pneumatic motor 19. The valvular means 42, which is reversible, has an operating member 43 connected to the pivoted trigger 13. The air passes through the valvular means 42 and is received within one or the other of a pair of inlet channels 44 and 45, see FIGURE 5, formed in the end cap 15. Depending on the position of the pivoted trigger 13, and whether the tool is adapted for forward or reverse operation, the air will enter either the inlet channel 44 or the inlet channel 45.

Moreover, the end cap 15 is preferably formed as a cast member having a hardened wear ring 46 inserted within a trepan 47. This wear ring 46 forms a cover for a portion of the inlet channels 44 and 45, such that a portion of the air is ducted into a pair of kidney-shaped canals 48 and 49 which are in communication with the inlet channels 44 and 45, respectively. The purpose of the canals 48 and 49, which are conventional, is to blow the rotor vanes 23 out of their respective slots 22 and prevent the vanes from being stuck within their respective slots. The particular formation of the hardened wear ring 46, and the manner in which it forms a cover for a portion of the canals 48 and 49, forms no part of the present invention; but is described more particularly in the Zizka Patent 3,080,851, issued Mar. 12, 1963. The end cap 15, however, also serves the function of a rear end plate means for the pneumatic motor, and this, together with the cantilevered mounting of the rotor 21, enhances the compactness and economy of the overall tool.

Preferably, but not necessarily, the air is then ducted forwardly into the rotor 21, and the major portion of the air is discharged through a port 50, see FIGURE 7, formed in the forward end plate 35. This port 50, see FIGURE 6, communicates with an internal annular channel 51 formed in the forward end plate 35, and the channel 51 in turn communicates with lower discharge ports 52 in the housing. As a result, the air is discharged out of the tool, and this constitutes the primary exhaust means for the motor. In addition, any air which may be entrapped behind a respective rotor vane is discharged via the opposite inlet channel (44 or 45, as the case may be); and this constitutes a secondary exhaust for the motor in accordance with conventional practice.

A modification of the cantilevered rotor supporting means is illustrated in FIGURE 8. Here, a double-row ball bearing 34' is provided; and this bearing 34' is not retained within the forward end plate 35, but rather, is disposed axially of, and forwardly adjacent to, the forward end plate 35. This modification is suitable, for example, for use in a direct drive unit operating a disc sander or other tool. Moreover, the combination of the bearing 34' and the rotor shaft 25' are obtained as a unitary subassembly, with the rotor shaft 25' having cooperating external annular grooves 53 serving as the inner race of the bearing 34'.

The operation of the pivoted trigger 13, and the manner in which it facilitates a forward and reverse "one hand" operation of the tool, forms no part of the present invention, but is described more particularly in the co-pending Maffey application Ser. No. 483,650, filed Aug. 30, 1965, entitled "Pivoted Trigger Means for Portable Power-Operated Reversible Tool," and assigned to the assignee of the present invention.

Moreover, the details of the valvular means 42 forms no part of the present invention, but is described more particularly in the co-pending Wickham application Ser. No. 499,733, filed Oct. 21, 1965, entitled "Valve for Reversible Pneumatic Motor," and assigned to the assignee of the present invention.

Obviously, many modifications may be made without departing from the basic spirit of the present invention; and accordingly, within the scope of the appended claims, the invention may be practiced other than has been specifically described herein.

I claim:
1. In a pneumatic tool having a motor housing, a transmission housing extending forwardly therefrom, and a plate means separating the motor housing from the transmission housing, the improvement which comprises:
   (A) bearing means retained in said plate means;
   (B) a rotor shaft journaled in said bearing means;
   (C) said rotor shaft having a portion extending rearwardly of said bearing means into the motor housing; said rearwardly-extending portion being unsupported at its end, whereby said rotor shaft is cantilever mounted;
   (D) rotor means carried by said rearwardly-extending portion of said rotor shaft;
   (E) said rotor shaft also having a portion extending forwardly of said bearing means; and
   (F) a transmission within the transmission housing; said transmission having at least one element thereof supported by said forwardly-extending portion of said rotor shaft.

2. The improvement of claim 1, wherein:
   (A) said bearing means comprises a double-row ball bearing.

3. The improvement of claim 1, wherein:
   (A) said plate means comprises a front end plate for said rotor means; and wherein:
   (B) said rotor means is spline-fitted on said rearwardly-extending portion of said rotor shaft.

4. The improvement of claim 3, wherein:
   (A) a spacer collar is piloted on said rotor shaft, radially between said rotor shaft and said front end plate, and axially between said bearing means and said rotor means; and wherein:
   (B) an end cap is secured rearwardly by the motor housing;
   (C) whereby said spline-fitted rotor means has a limited axial floating movement between said end cap and said spacer collar.

5. The improvement of claim 1, wherein:
   (A) said forwardly-extending portion of said rotor shaft has a blind axial bore formed therein; and
   (B) said element of said transmission comprises a spindle having an end portion rotatably fitted in said blind axial bore.

6. The improvement of claim 5, wherein:
   (A) said forwardly-extending portion of said rotor shaft is enlarged, radially of said blind axial bore; and
   (B) said transmission comprises an impact clutch mechanism having a hollow-cylindrical hammer mass rotatably supported upon said enlarged forwardly-extending portion of said rotor shaft.

References Cited
UNITED STATES PATENTS

| | | | |
|---|---|---|---|
| 2,404,262 | 7/1946 | Whitfield | 92—121 |
| 2,711,662 | 6/1955 | Shaff | 173—93.5 |
| 2,947,283 | 8/1960 | Roggenburk | 173—93.5 |
| 3,080,851 | 3/1963 | Zizka | 91—138 |

FRED C. MATTERN, JR., *Primary Examiner.*

L. P. KESSLER, *Assistant Examiner.*